Patented June 3, 1952

2,599,172

UNITED STATES PATENT OFFICE 2,599,172

SULFURIC ACID ESTERS OF HYALURONIC ACID AND PROCESSES FOR THE PRODUCTION THEREOF

Zareh Hadidian, Needham, Mass., assignor to G. D. Searle & Co., Chicago, Ill., a corporation of Illinois No Drawing. Application November 29, 1948, Serial No. 62,597

6 Claims. (Cl. 260—210)

This invention relates to sulfuric acid esters of hyaluronic acid and to processes for the preparation thereof. More particularly, this invention relates to new products obtained by esterification with chlorosulfonic acid and fuming sulfuric acid, particularly at low temperature, of hyaluronic acid obtained from mammalian tissues.

I have discovered that the sulfuric acid esters of hyaluronic acid from mammalian tissue have certain properties which may make them useful agents in the preparation of medicinal, therapeutic, and pharmaceutical compositions. For example, these esters of hyaluronic acid are useful as inhibitors for the enzyme hyaluronidase. Furthermore, certain of the substances of this invention are useful in preventing coagulation of whole blood and possibly in the prevention of anaphylaxis.

Hyaluronic acid is a mucopolysaccharide which constitutes part of the connective tissue of cells of animals and humans. It is composed for the most part of glucuronic acid and acetylglucosamine. A specific enzyme, hyaluronidase, exists in certain bacteria, venoms, spermatazoa, and other sources and may play a role in the process of invasion of cells and tissues by depolymerization of hyaluronic acid, the ground substance of connective tissue. Hyaluronic acid has been isolated with varying properties from umbilical cords, skin, vitreous humor, synovial fluid, tumors and haemolytic streptococci.

Hyaluronidase is believed to take part in a number of important processes, including conception, and invasion by pathogenic organisms. It is also believed to be a factor in rheumatoid arthritis, causing reduction in viscosity by hydrolysis or depolymerization of the ground substance of the human mesenchyme in which rheumatic processes are predominantly manifested. Inhibitors of the enzyme hyaluronidase are of possible value as contraceptives and for the prevention of invasion by micro-organisms, and also as therapeutic agents in the treatment of arthritis. It is the object of this invention to provide such enzyme inhibitors and also efficient methods for their production.

The formation of sulfuric acid esters of hyaluronic acid from mammalian tissues can be carried out under a variety of conditions. It is possible to react hyaluronic acid in pyridine with chlorosulfonic acid at elevated temperatures in the range of 50–100° Centigrade. More preferably the reaction is conducted at about 50° C. in formamide and pyridine with chlorosulfonic acid. A more simple and efficient method involves the reaction with chlorosulfonic acid or with fuming sulfuric acid at low temperatures in the range of −20° to 10° C. After the esterification reaction has been completed (usually within a few minutes) the reaction mixture is poured into ice water, neutralized with alkali, and the resulting aqueous solution is dialyzed to remove salts and then concentrated under high vacuum at low temperature to produce a fine white, or nearly white, dry powder of the alkali metal salt of the sulfuric acid ester of hyaluronic acid. The alkali metal salts of the hyaluronic acid sulfuric acid esters may also be precipitated from aqueous alkaline solutions by the addition of several volumes of alcohol or other precipitant.

The alkali metal and alkaline earth salts of the hyaluronic acid sulfuric acid esters are preferred forms of my invention. Such salts are light-colored, fine powders which are readily soluble in water and suitable for medicinal application. The free acid form of the sulfuric acid esters of derivatives of hyaluronic acid can be prepared by dialyzing solutions of the metal salts after acidification with mineral acid, and evaporation at low temperature under high vacuum. The sulfuric acid esters of hyaluronic acid from mammalian tissue, which comprise my invention, have low relative viscosities in the range of 1.01 to 1.2. These derivatives are all soluble in water, in ⅔ saturated ammonium sulfate, and 80% alcohol, but are insoluble in the presence of excess cations in alcoholic solutions of greater than 40% strength. They are soluble in 1 N acid and in 1 N alkali. They are inhibitors of the enzyme hyaluronidase, having an activity factor of about 2 at a concentration of 0.1 g./l. The alkali metal salts of compounds of this invention show on analysis nitrogen values ranging from 1.5 to 2.1%, acetyl values of 3 to 6%, glucosamine values of 12 to 22%, and sulfur values of 6 to 15%. The sodium salts having sulfur contents of 10–15% are preferred embodiments of my invention. The free acid esters have sulfur contents in the range of 12–16%.

The relative viscosities of the products of this invention are determined by the method of the Hadidian and Pirie application Serial No. 6,014, filed February 3, 1948. The inhibition factors, that is, the relative abilities to inhibit hyaluronidase, are measured by the procedures of the same application. The hyaluronic acid preparations are produced according to the Hadidian and Pirie application Serial No. 6,015, filed February 3, 1948, now Patent No. 2,585,546.

The following examples indicate in detail the methods of preparing compounds of this invention, and illustrate the properties of representative compounds. These examples are provided solely for the purpose of illustration and are intended in no way to limit the invention in spirit or in scope.

Example 1

A mixture of 7 millimeters of chlorosulfonic acid and 30 ml. of dry pyridine is cooled to 0° C. To this are added 2–3 grams of dry, finely powdered hyaluronic acid from human umbilical cords. The resulting suspension is heated to 100° C. for about 45 minutes, during which time most of the hyaluronic acid goes into solution. The reaction mixture is emptied into 200 ml. of cold water and the pyridine salt of the hyaluronic acid sulfuric acid ester is precipitated by the addition of several volumes of alcohol. The precipitate is removed and dissolved in dilute sodium hydroxide solution. The sodium salt of the hyaluronic acid sulfuric acid ester is precipitated by the addition of several volumes of alcohol. The product thus obtained from a medium viscosity hyaluronic acid contains 3.12% N, 6.08% S, and gives a residue (mainly sodium sulfate) on ignition of 13.4%.

Example 2

A medium viscosity hyaluronic acid is esterified according to Example 1, the reaction time at 100° C. being 60 minutes. The sodium salt of the hyaluronic acid sulfuric acid ester so obtained contains 13.33% S and gives a residue (mainly sodium sulfate) on combustion of 28.95%.

Example 3

A low viscosity hyaluronic acid from human umbilical cords is converted to the sulfuric acid ester according to the procedure of Example 1. The sodium salt of this product contains 2.21% S, 3.68% N and gives a residue of 11.46% on ignition.

Example 4

Hyaluronic acid from human umbilical cords is dried by sublimation and mixed with formamide (40 ml. of formamide per gram of hyaluronic acid), and kept at 50° C. until a viscous solution is obtained. To this is added an equal volume of pyridine and ⅓ volume of chlorosulfonic acid. The mixture is kept at 50° C. with occasional agitation for 2 hours, and then emptied into cold water (200 ml. per g. of hyaluronic acid used). If necessary, additional sodium chloride is added to this mixture to raise the concentration of sodium ions. Alcohol is added until the precipitation of hyaluronic acid sulfuric acid ester is complete. This precipitate is dissolved, neutralized with sodium hydroxide, and reprecipitated by the addition of several volumes of alcohol. The latter precipitate is removed and dried in vacuum. The sodium salt so obtained from medium viscosity hyaluronic acid contains 3.0% N, 8.89% S, 6.3% acetyl, and leaves a residue (consisting mainly of sodium sulfate) on ignition of 26.9%.

Example 5

A low viscosity hyaluronic acid from human umbilical cords sulfonated according to the method of Example 4 gives a sodium salt of hyaluronic acid sulfuric acid ester containing 2.55% N and 5.84% acetyl.

Example 6

Hyaluronic acid is dried by sublimation and cooled to between −5° C. and −15° C. Forty to sixty parts of chlorosulfonic acid are cooled to between −5° C. and −15° C. and then added to the cold hyaluronic acid, the mixture being kept at about −15° C. to 5° C. for 7 minutes. The reaction mixture is then poured with good agitation into several hundred parts of crushed ice. The mixture is neutralized with 10 N sodium hydroxide and dialyzed to remove salts. The dialyzed solution is concentrated at ordinary temperature in vacuum, and the resulting sodium salt of the hyaluronic acid sulfate acid ester is precipitated with several volumes of alcohol. The precipitate is redissolved, dialyzed, and dried by sublimation, and contains on analysis 2.58% N, 11.9% S and gives a residue of 34.0%.

Example 7

Low viscosity hyaluronic acid is treated with chlorosulfonic acid according to Example 6 for 15 minutes at −10° C. to −15° C. The salt produced assays 1.84% N, 4.8% acetyl and 12.9% S. On ignition it leaves 30.03% residue.

Example 8

Hyaluronic acid from pig umbilical cord is reacted as in Example 6 for 1 hour while the temperature rises from −20° C. to −5° C. The salt so isolated assays 2.0% N, 21.5% glucosamine, 5.6% acetyl and 9.05% S and leaves 23.43% residue. The relative viscosity of a solution of 1.0 g./l. is 1.06. The inhibition factor is 2.5 at 0.1 g./l.

Example 9

A high viscosity hyaluronic acid from human cord is treated by the method of Example 6 for 10 minutes at −5° C. to −10° C. The sodium salt is isolated as in Example 6 and assays 1.48% N, 3.95% acetyl, 14.09% S and 17.3% glucosamine; it gives a residue on ignition of 30.77%. The relative viscosity of this salt at a concentration of 1 g./l. is 1.01. The salt has an inhibition factor of 2.0 at 0.1 g./l.

Example 10

A high viscosity hyaluronic acid from human cord is converted to the fulfuric acid ester and the purified sodium salt is isolated by the methods of Example 6. The salt assays 1.8% N, 4.2% acetyl, 16.4% glucosamine, 9.82% S and 25.54% ash on ignition. The relative viscosity of a solution of 1 g./l. is 1.13. The inhibition factor at 0.1 g./l. is 2.3.

Example 11

Low viscosity hyaluronic acid from vitreous humor of cattle is esterified with chlorosulfonic acid according to Example 6. The purified sodium salt is isolated as in Example 6 and assays 1.6% N, 4.4% acetyl, 13% glucosamine, 13.14% S and 31.62% ash on ignition. The relative viscosity of the salt at 1 g./l. is 1.03. The inhibition factor is 1.93 at 0.1 g./l.

Example 12

High viscosity hyaluronic acid is converted to the sulfuric acid ester sodium salt as in Example 6. The salt assays 1.97% N, 5.83% acetyl, 19.1% glucosamine, 24.73% ash and 10.80% S. Its relative viscosity at 1 g./l. is 1.10 and its inhibition factor at 0.1 g./l. is 1.90.

Example 13

High viscosity hyaluronic acid in the form of a dry powder is cooled to −10° C. Sixty to eighty parts of fuming sulfuric acid (20% free $SO_3$) are cooled to −10° C. and added to the hyaluronic acid. The temperature is kept at −10° C. to −5° C. for about 10 minutes. The reaction mixture is then poured into several hundred parts of crushed ice and neutralized with dilute alkali. The resulting solution is dialyzed and the dialyzed solution is concentrated under vacuum. The alkali metal salt of the sulfuric acid ester of hyaluronic acid is precipitated by the addition of several volumes of alcohol. A sodium salt obtained in this way assayed 1.74% N, 5.08% acetyl, 14.4% glucosamine, 25.00% ash and 10.88% S. Its relative viscosity was 1.09 at 1 g./l. and its inhibition factor 2.6 at 0.1 g./l.

*Example 14*

A low viscosity hyaluronic acid from human umbilical cords is converted to the sodium salt of hyaluronic acid sulfuric acid ester by reaction with chlorosulfonic acid at −10° C. to −15° C. for 15 minutes and the salt is isolated by the method of Example 9. This salt assays 1.86% N, 3.8% acetyl, 13.2% glucosamine and 12.90% S. It gives 30.03% residue. The relative viscosity of a solution of this salt at 1 g./l. is 1.02. The inhibition factor at 0.1 g./l. is 1.95.

*Example 15*

A medium viscosity hyaluronic acid is esterified with fuming sulfuric acid by the procedure of Example 13. The sodium salt of the hyaluronic acid sulfate thus obtained showed on assay 9.39% S and 24.25% ash.

*Example 16*

A medium viscosity hyaluronic acid is treated with chlorosulfonic acid at about −80° C. The temperature is allowed to rise to about 5° C. over a period of about one hour. The sodium salt of the hyaluronic acid sulfate is isolated as in Example 9. This salt on assay showed 8.64% S and 23.75% ash.

*Example 17*

The sodium salt of the hyaluronic acid sulfate obtained in Example 5 from low viscosity hyaluronic acid is dissolved in water and acidified with 6 N hydrochloric acid to pH 1.0. The aqueous acidic solution is then dialyzed thoroughly against water. The dialyzed solution of the acid form of hyaluronic acid sulfate is then evaporated under high vacuum and low temperature to form a nearly white, fluffy powder. This product is readily soluble in water. On analysis a sample showed 7.14% S and 0.65% ash on ignition.

I claim:
1. As a new composition of matter, a member of the group consisting of a hyaluronic acid sulfate, wherein the hyaluronic acid is obtained from mammalian tissue, said compound containing 12 to 16% of sulfur, and salts thereof.

2. An alkali metal salt of a hyaluronic acid sulfate, wherein the hyaluronic acid is obtained from mammalian tissue, said salt containing 10 to 15% of sulfur.

3. A sodium salt of a hyaluronic acid sulfate, wherein the hyaluronic acid is obtained from mammalian tissue, said salt containing 10 to 15% of sulfur.

4. In the process of producing a hyaluronic acid sulfate, the step which comprises reacting hyaluronic acid with an acid of the group consisting of chlorosulfonic acid and fuming sulfuric acid, at a temperature in the range of about −20° C. to about 10° C.

5. In the process of producing a hyaluronic acid sulfate, the step which comprises reacting hyaluronic acid and chlorosulfonic acid, at a temperature in the range of about −20° C. to about 10° C.

6. The process of producing a salt of a hyaluronic acid sulfate which comprises reacting hyaluronic acid and chlorosulfonic acid at a temperature in the range of about −20° C. to about 10° C., neutralizing the reaction mixture, dialysis of the neutral solution and precipitation with alcohol of the salt of the hyaluronic acid sulfate.

ZAREH HADIDIAN.

REFERENCES CITED

The following references are of record in the file of this patent:

Chargaff et al., J. Biol. Chem., v. 115 (1936), p. 155–161, 7 pages.

Karrer, Helv. Chim. Acta, v. 26 (1943), p. 1296–1300, 1309, 1310, 7 pages.

Pigman, "Advances in Carbohydrate Chemistry," vol. 2 (1946), p. 179–184, 6 pages.

Bergamini, Chem. Abs., v. 43 (1949), p. 3855 g, 1 page.